Nov. 13, 1962 R. M. VAUGHN 3,063,329
FASTENING ELEMENT WITH NUT PORTION EXPANDABLE
OVER SLEEVE AND THEN CURLED INTO ANNULAR
GROOVE IN SAID SLEEVE
Filed March 7, 1958

INVENTOR.
RUDOLPH M. VAUGHN
BY *Elliott & Pastoriza*
ATTORNEYS

United States Patent Office 3,063,329
Patented Nov. 13, 1962

3,063,329
FASTENING ELEMENT WITH NUT PORTION EXPANDABLE OVER SLEEVE AND THEN CURLED INTO ANNULAR GROOVE IN SAID SLEEVE
Rudolph M. Vaughn, 2008 N. Westwood,
Santa Ana, Calif.
Filed Mar. 7, 1958, Ser. No. 719,933
3 Claims. (Cl. 85—2.4)

This invention relates to fastening devices and more particularly to a high shear strength fastener for securing together overlapping plates and the like wherein access may be had to only one side of the plates.

This application is a continuation-in-part of my co-pending application Serial No. 566,442, filed February 20, 1956, now U.S. Patent No. 2,863,351.

A primary object of the present invention is to provide a blind fastener of a type similar to that disclosed in the aforementioned co-pending application but including improved features which will insure retention of the fastener once it has been inserted in place.

Another important object of the inventtion is to provide a blind fastener in the form of a blind nut which may be positioned on one side of a plate without having access to said one side whereby during subsequent operations members may be secured to the plate by conventional screws threading into the blind nut.

Still other objects of the invention are to provide blind fasteners capable of withstanding much higher shear forces than known fastening devices, and which are effective in securing together members of different overall thicknesses so that a standardized blind fastener capable of accommodating members of several different thicknesses may be manufactured.

These and many other objects and advantages of this invention are attained by providing three basic elements in the form of a screw, a sleeve member and an expandable nut. The inside diameter of the expandable nut is less than the outside diameter of the sleeve member so that the nut and sleeve may be inserted through one side of an opening in plate members to be fastened together. The screw is arranged to thread into the nut to drive the nut over the end of the sleeve to bear against the peripheral portion of the other side of the opening in the plates.

In accordance with an important feature of the present invention, the sleeve includes an exterior radius defining an annular indentation. This radius deforms a portion of the nut received over the sleeve causing this portion to curl inwardly to fill the indenttaion and thus securely lock the nut to the sleeve end. The annular end portion of the nut itself includes a chamfer arranged to co-operate with a mating chamfer having secondary threads on the sleeve end to facilitate the initial pulling of the nut over the sleeve. This chamfer portion on the nut terminates in an annular seating surface angulated with respect to the horizontal such that after the turning in of the lower portion of the nut, the annular seating surface will be level and will seat about the entire periphery of the opening in the plate with which the fastener is employed.

Because the nut is locked to the sleeve, the screw employed for driving the nut over the sleeve may be subsequently removed and there is effectively provided a blind nut in the plate member. A separate plate or other member may then be fastened to the plate supporting the blind nut without access to the other side of the plate.

A better understanding of the improved blind fastener of this invention will be had by referring to the accompanying drawings in which.

Figure 1:
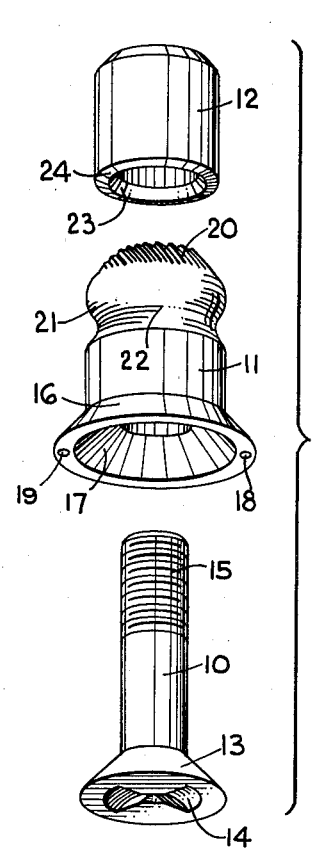
FIGURE 1 is an exploded perspective view of the basic elements forming the blind fastener.

Referring first to FIGURE 1, the basic elements of the fastener comprise a screw 10, sleeve member 11, and a nut 12. The screw 10 includes a head portion 13 provided with a high torque slot 14 of the type described in my United States Patent No. 2,677,985, issued May 11, 1954, and entitled "Slotted Screw Head." The other end of the screw 10 is provided with conventional screw threads 15.

The sleeve 11 includes an enlarged head portion 16 having a conical recessed entrance portion 17 for seating the exterior conical surface of the head 13 of the screw. Suitable holding means in the form of small openings 18 and 19 are provided on the surface of the sleeve head at diametrically opposite points. The upper end of the sleeve terminates in secondary screw threads 20 formed on a chamfered surface as shown. The thread direction of the screw threads 20 is opposite to that of the thread direction of the threads 15 on the screw 10. Below the screw threads 20 the chamfered surface of the sleeve 11 merges into an inwardly directed radius 21 defining an annular indentation 22, the purposes for which will become clearer as the description proceeds.

Figure 2:
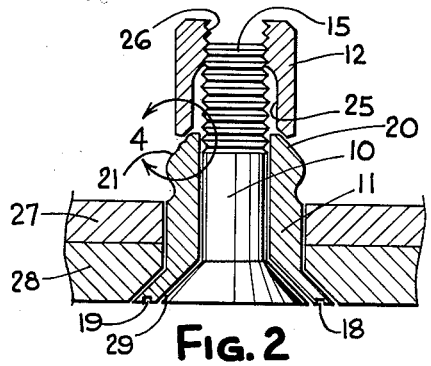
FIGURE 2 is an elevational view partly in cross section showing the blind fastener in position just prior to tightening the same for holding a pair of plate members together.

The nut 12 has an interior diameter less than the exterior diameter of the sleeve 11 and terminates at its lower end in a chamfered annular surface 23 arranged to mate with the angle of the chamfer on which tne threads 20 are cut for the sleeve member. The chamfer 23 itself terminates at its lower end in an annular seating surface 24, which is angulated upwardly with respect to the horizontal. As best seen in FIGURE 2, the interior portion of the nut 12 includes an annular recess 25 above the chamfer, and internal threads 26 arranged to receive the threads 15 of the screw 10.

In FIGURE 2, the various elements of FIGURE 1 are illustrated in assembled form for fastening a pair of plates 27 and 28 together. It is assumed that access can only be had to the front of plate 28. Initially, the fastener comprising the screw 10, sleeve 11, and nut 12 are assembled as illustrated in FIGURE 2 with the screw partially threaded to the nut and in this position, the device may be inserted through one side of a suitable opening passing through the plates 27 and 28. Preferably, the entrance of the opening in the plate 28 is beveled as at 29 to seat the enlarged head 16 of the sleeve member 11 and thus provide a flush surface for the fastener once it has been tightened.

With the various elements assembled as shown in FIGURE 2, a holding device is positioned in the sleeve head openings 18 and 19 and the sleeve held against rotation while a right hand torque is applied to the screw 10 to thread the nut 12 downwardly towards the sleeve as viewed in FIGURE 2. This action causes the nut to expand radially over the end of the sleeve. In this regard, the secondary threads 20 will bite into the chamfer surface 23 of the nut 12 and because of their opposite threading direction will prevent rotation of the nut with the screw and aid in causing the nut to expand and be pulled downwardly over the end of the sleeve.

Figure 3:
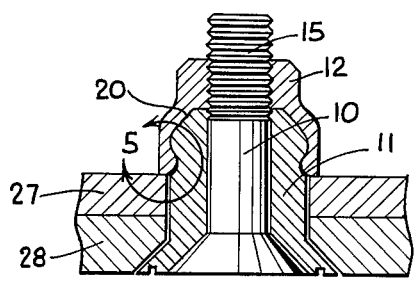
FIGURE 3 is a view similar to FIGURE 2 illustrating the relative positions of the parts of the fastener after the fastening has been effected.

FIGURE 3 illustrates the relative position of the parts after the screw 10 has been tightened sufficiently to cause the nut 12 to expand over the entire end portion of the sleeve 11.

Figures 4, 5:
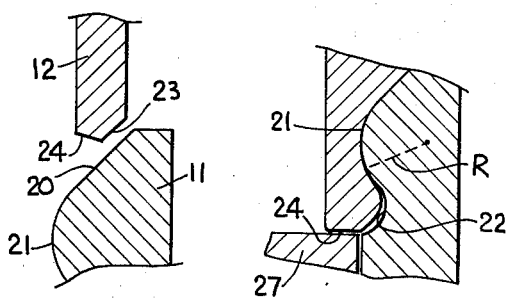
FIGURE 4 is an enlarged cross sectional view of that portion of the device enclosed within the circular arrow 4 of FIGURE 2.
FIGURE 5 is another enlarged cross sectional view of that portion of the device enclosed within the circular arrow 5 of FIGURE 3.
Figure 7:
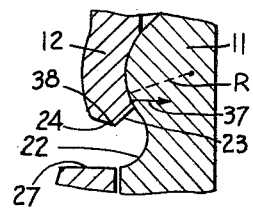
FIGURE 7 illustrates an intermediate step in the operation of securing the nut in accordance with the invention.

Referring to the enlarged view of FIGURE 4, the manner in which the chamfer 23 at the lower end of the nut initially seats on the corresponding chamfer of the sleeve end 11 is shown. Moreover, it will be evident that the seating surface 24 forms an angle in cross section with the horizontal. The chamfered portion 23 and seating surface 24 are illustrated in FIGURE 5 in their new positions after the device has been completely tightened. Because of the radius 21 defining the annular indentation 22 and indicated at R in FIGURE 5, the initial movement of the lower portion of the nut over this radius will cause this portion to expand. Since the nut material retains some of its elasticity, it will then tend to contract radially inwardly as indicated by the arrow 37 in FIGURE 7. Thus, the malleable material of the nut will flow into the annular indentation 22 and this action in turn will orient the seating surface 24 towards the horizontal in a position to seat firmly with full area contact against the pheriphery of the opening in the plate 27. When this engagement is initially effected, only the intersection of the chamfered portion 23 and seating surface 24 defining a line contact 38 initially engages the plate 27. The final seating forces will urge the seating surface into full engagement to in turn urge more material radially inwardly to fill the annular indentation 22. It will be evident, accordingly, that the two actions of elasticity and final seating result in a thorough locking of the nut within the indentation in the sleeve.

As a consequence of the flow of the nut material into the annular indentation to effect the described locking of the nut onto the sleeve, the screw 10 of FIGURE 3 could be removed and a blind fastener structure still provided. However, the material of the screw 10 itself has a very high shear strength and the screw therefore would be normally retained in place. The feature of removability, however, enables the provision of a blind nut.

Figure 6:
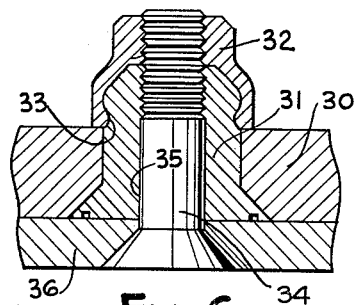
FIGURE 6 illustrates a modified fastener for providing a blind nut.

Referring specifically to FIGURE 6, for example, there is illustrated a plate member 30 having an opening receiving a sleeve 31 over which a nut 32 has been driven and locked within an annular indentation 33. The driving of the nut 32 over the sleeve 31 in FIGURE 6 can be effected by a screw 34 as described in connection with FIGURES 2 and 3. In the particular sleeve employed in FIGURE 6, however, the entrance opening is not beveled as in the case of the sleeve 11 of FIGURES 1, 2, and 3, but rather is of uniform diameter as indicated at 35. As a result, upon removal of the screw 34, there will be provided a bore opening defined by the inside of the sleeve 31 and the threaded portions of the nut 32 thereby providing a blind nut in the plate 30. Subsequently, if it is desired to fasten a second plate or member 36 to the plate 30, it is only necessary to pass a single screw, such as the screw 34, through a suitable opening in the plate 36 and thread it into the nut 32.

From the foregoing, it will be evident that the present improved blind fastener can readily be adapted to the provision of blind nuts whereby a series of screw receiving nuts may be provided on a basic plate member even though access may be had to only one side of the plate. Subsequently, these nuts may receive various screws to hold other plates or members to the basic plate member.

The annular indentation on the sleeve not only secures the nut in place, but this features also insures a 360° seating surface of the end of the nut 12 about the periphery of the opening on the blind side of the plate. The radius itself defining the upper portion of the indentation is important in that it effects the desired curling-in action of the end portion of the nut as the same is caused to move axially down on the sleeve. The resulting fastener has been found to exhibit all of the high shear properties described in connection with the aforementioned co-pending application.

Various modifications incorporating the principles of the present invention will readily occur to those skilled in the art. The improved blind fastener is, therefore, not to be thought of as limited to the specific embodiment disclosed for illustrative purposes.

What is claimed is:

1. A blind fastener adapted to be passed through registered openings in members to enable securement of the members together from one side thereof, comprising: a threaded screw having a head; a sleeve adapted to receive said screw and seat said head, the end of said sleeve extending beyond the opening in the opposite side of said members and the end of said screw extending beyond the end of said sleeve when said sleeve and screw are passed through said registered openings, said sleeve having an annular indentation located adjacent to said opposite side defined by a radius formed in the external surface of said sleeve; an expandable nut threaded to the end of said screw such that turning of said screw in one direction moves said nut axially towards said end of said sleeve, said nut being of a material softer than the material of said sleeve and including a recessed portion extending interiorly from the internal adjacent end portion of said nut, said recessed portion having a greater inside diameter than the outside diameter of said screw; and external secondary thread means on said end of said sleeve adapted to engage said adjacent end portion, said secondary thread means having a pitch opposite to that of said threaded screw such as to drive said nut axially over said end of said sleeve and over said radius when said screw is turned in one direction, said adjacent end of said nut including a chamfered inside surface portion intersecting an annular seating portion inclined opposite to that of the chamfered surface portion, said annular seating portion forming an angle with the horizontal such that movement of said chamfered surface portion over said radius formed on said sleeve curls said adjacent end into said annular indentation, the intersection formed by said chamfered surface portion and seating portion initially forming a substantial line contact with said opposite side, further movement of said nut seating said annular seating surface in complete continuous surface engagement over 360 degrees with said opposite side of said members whereby said nut is locked to said sleeve.

2. A blind nut comprising: a sleeve member having an enlarged diameter head portion and an annular indentation about its exterior; a nut of internal diameter less than the outside diameter of said sleeve member, said nut having an interior recessed portion and an interior threaded portion, said interior recessed portion terminating in an annular chamfered inside end surface intersecting an annular seating surface inclined opposite to that of the chamfered surface, and said sleeve having a mating chamfered end on which said chamfered surface of said nut initially rests, said mating chamfered end merging into said annular indentation to define a radius whereby said sleeve may be passed through an opening in a member and a screw may be passed through said sleeve to threadedly engage said nut and drive the interior recessed portion of said nut over said sleeve and said radius so that the intersection of said annular chamfered inside end surface and said seating surface forms a line contact with the surface surrounding the opening in said member, further driving of said nut seating said seating surface in full surface contact with said surface surrounding the opening in said member to curl said annular chamfered inside end surface into said annular indentation to lock said nut to said sleeve.

3. The subject matter of claim 2, in which said sleeve includes threads on its chamfered portion having a thread direction opposite to that of the threads on said nut.

References Cited in the file of this patent

UNITED STATES PATENTS

| | | |
|---|---|---|
| 626,040 | Rowlands | May 30, 1899 |
| 1,120,409 | Rohmer et al. | Dec. 8, 1914 |
| 2,341,598 | Crowley | Feb. 15, 1944 |
| 2,343,143 | Gill | Feb. 29, 1944 |
| 2,385,126 | Benton | Sept. 18, 1945 |
| 2,536,353 | Cooper | Jan. 2, 1951 |
| 2,646,098 | Pummill | July 21, 1953 |
| 2,863,351 | Vaughn | Dec. 9, 1958 |

FOREIGN PATENTS

| | | |
|---|---|---|
| 27,896 | Great Britain | Dec. 1, 1910 |
| 681,974 | Great Britain | Oct. 29, 1952 |